(12) United States Patent
Müller et al.

(10) Patent No.: US 6,662,585 B2
(45) Date of Patent: Dec. 16, 2003

(54) ENERGY ADMINISTRATION DEVICE

(75) Inventors: Volker Müller, Hilchenbach (DE); Jörg Peter, Siegen (DE)

(73) Assignee: Dometic. GmbH, Siegen (DE)

( * ) Notice: Subject to any disclaimer, the term of this patent is extended or adjusted under 35 U.S.C. 154(b) by 0 days.

(21) Appl. No.: 10/271,154

(22) Filed: Oct. 15, 2002

(65) Prior Publication Data

US 2003/0070444 A1 Apr. 17, 2003

(30) Foreign Application Priority Data

Oct. 15, 2001 (DE) .......................... 101 50 819

(51) Int. Cl.⁷ .............................. F25B 27/00
(52) U.S. Cl. ........................................ 62/236
(58) Field of Search .................... 62/236, 476, 149

(56) References Cited

U.S. PATENT DOCUMENTS 4,487,030 A    12/1984   Carter et al.
5,867,996 A  * 2/1999   Takano et al. ............... 62/175
6,105,375 A  * 8/2000   Takano et al. ............... 62/149

FOREIGN PATENT DOCUMENTS

DE   31 33 686 C2    3/1990
EP   0 908 679 A1    4/1999

* cited by examiner

Primary Examiner—Melvin Jones
(74) Attorney, Agent, or Firm—Pearne & Gordon LLP

(57) ABSTRACT

An energy administration device serves for operating an absorption refrigerating device with different energy sources and includes an energy control unit (7) for controlling and selecting an energy source. It includes at least one gas operation unit (8 to 12) for operating said absorption refrigerating device with gas with a gas burner connected to a gas supply line, which can be controlled by a surveillance system. Said surveillance system is an ignition surveillance system and includes an ionisation sensor and/or UV sensor for surveying said gas flame of said gas burner (11).

14 Claims, 1 Drawing Sheet

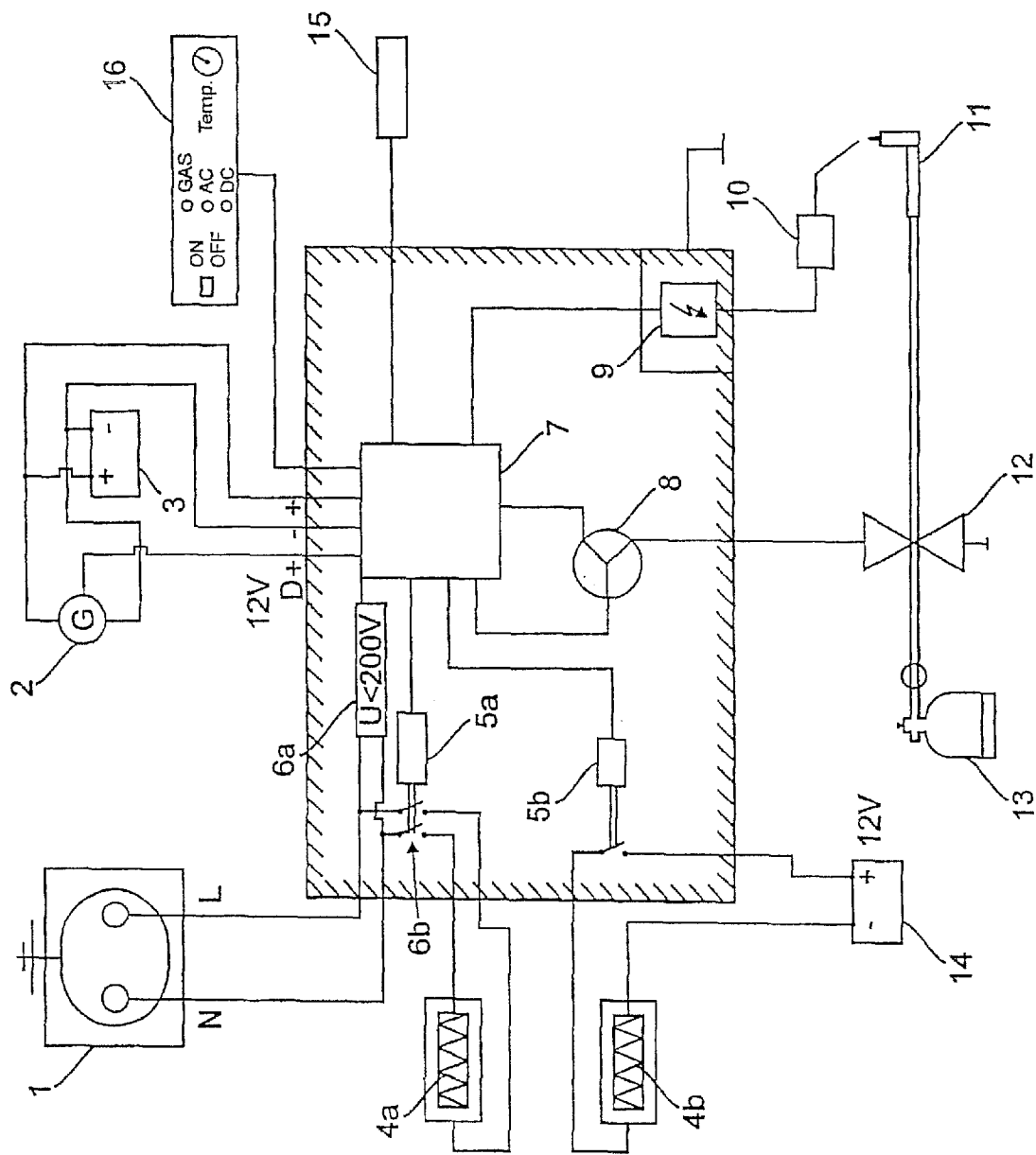

ENERGY ADMINISTRATION DEVICE

This application claims priority from German Patent Application No. 101 50 819.0, filed Oct. 15, 2001.

BACKGROUND OF THE INVENTION

The invention relates to an energy administration device for operating an absorption refrigerating device using different energy sources, an absorption refrigerating device in particular, which is intended for installation in a living van, caravan or the like. Furthermore, the invention pertains to an absorption refrigerator comprising an energy administration device for operation with different energy sources and being provided for being installed in living vans, caravans or the like in particular.

From DE 31 33 686 C2 an absorber refrigerating unit of a refrigerator for touring caravan and the like, which can be operated using an AC source, a DC source or a liquid gas source. For this purpose the absorber refrigerating device can be automatically switched by means of an electric circuit comprising a plurality of switches and relays. In particular, in this circuit it is detected when during operation with AC current or DC current the voltage drops below a given value and subsequently switching is effected to another energy operation mode. The gas operation system of said absorber refrigerating device comprises a surveillance system using a thermal switch, since using said thermal switch extinction of gas flame is detected and a valve is selected which interrupts gas supply. In this manner of accident survey it is disadvantageous that said thermal switch has a very long response time of 30 to 60 second so that accidents can be detected with long temporal delay only, this impairing safety of the system.

From U.S. Pat. No. 4,656,821 a gas-operated absorption refrigerator is known whose gas supply is regulated via a magnetically controllable valve. This device in the are of the ignition device for the gas burner comprises a thermal element surveying the flame of the burner and selecting an "electrically selectable valve" for interrupting of the gas supply, when the flame of the burner is extinguished. In addition, a second sensor is provided for which is coupled to a time switch device and surveys the ignition process of the gas flame. It is guaranteed by this sensor in particular, that the ignition process is not repeated immediately after ignition failed. This system also only comprises thermal elements having a comparatively long response time, for surveillance of the gas flame.

SUMMARY OF THE INVENTION

It is, therefore, the main object of the present invention to improve safety of the gas operation in an energy administration device of an absorber refrigerator and to achieve a more accurate control of the entire system.

This object is achieved by the energy administration device as defined in claim 1 as well as by the absorption refrigerator as defined in claim 14.

The energy administration device in accordance with the present invention permit operation of an absorption refrigerating unit with different energy sources and for this purpose comprises an energy control unit for controlling and selecting the energy sources. In addition, said device includes a gas operation unit for operating said absorption refrigerating device with gas, said gas operation unit comprises a burner connected to a gas supply line and being controllable using an ignition surveillance system. The invention is characterized in that said ignition surveillance system comprises an ionisation sensor and/or UV sensor for surveying the gas flame of said gas burner. The use of such sensors is known per se from gas-firing machines, however, never before its use was proposed in energy administration systems for absorber refrigerators.

In case of surveillance using ionisation sensors AC voltage is applied between the sensor electrode and said gas burner mass. The flame rectifies the voltage and said DC signal is recognized by said energy administration device. As compared thereto, in UV surveillance an UV sensor is used which essentially consists of a UV-sensitive tube and electronic components. Only in case of UV radiation generated by the gas flame of said burner the tube switches through. Through switching of the tube also is detected by said energy administration device. In said energy administration device in accordance with the present invention it is an essential advantage that surveillance using ionisation sensors or UV sensors, respectively, very accurately and almost without delay can detect failure of said gas flame. Therefore, an accident in gas operation can be detected much faster and as corresponding consequence gas supply can be interrupted. Thereby, an essentially more accurate control of the device and an improved safety in gas operation is guaranteed.

In a preferred embodiment said ionisation sensor is integrated into the ignition electrode of said gas burner. This permits a compact construction of said gas operation unit.

In a further embodiment the gas supply line comprises a valve electrically selectable by pulse width modulation, which interrupts gas supply when said absorption unit is not operated using gas or when, respectively, an accident is detected in said energy control unit. In case of control of the electrically selectable valve using pulse width modulation, at first an impulse is issued for opening said gas supply line for attracting said valve, and subsequently the voltage is reduced by pulse width modulation. This provides the advantage that the electric energy supply during gas operation is kept very low.

In another preferred embodiment said device comprises an AC operating unit for operation of an absorption refrigerating device with power supply, 230 V power supply in particular. Furthermore, in a particularly preferred embodiment in addition a DC operating unit for operating said refrigerating unit with DC voltage, 12 V DC voltage in particular, is provided for.

For automatic switching to different energy sources in a further embodiment of the present invention an undervoltage detection unit is provided for which is coupled to said energy control unit and said AC voltage operation unit in such manner that said energy control system selects said AC operation when said undervoltage detection unit detects a voltage above a threshold value and said energy control system switches to gas operation or DC operation, when said undervoltage detection unit detects a voltage below said threshold value. Hereby it is guaranteed that said system in case of switching off of power supply automatically is operated using another energy source. The DC voltage operating unit of said system preferably is located in said generator operation unit, the dynamo of the vehicle in particular, in which said absorption refrigerating unit is disposed.

The DC voltage operating unit 1 furthermore also can include a battery and/or solar operating unit. This permits operation by means of DC, also when the generator of the DC voltage operating unit is switched off.

In case the system comprises a DC operation unit, a DC detection means is provided for in a preferred embodiment, which is coupled to said energy control system so that said energy control system selects the DC operation when DC is detected, and another energy operation is selected when no or very low, respectively, DC current is detected. Herein switching to another kind of energy is guaranteed when the DC current of the system fails, e.g. when the generator of the system is switched off.

For controlling the optimum energy output, in a preferred embodiment of the present invention a temperature sensor, an NTC sensor in particular, is provided for arrangement in the refrigerator of said absorption refrigerating device, wherein said temperature sensor is connected to said energy control device and the different kinds of energy operation are controllable by means of the temperature detected by the sensor.

Beside the automatic energy operation control, in a further embodiment of the present invention in addition a possibility of manual change is given, which permits manual change to the different kinds of energy operation. Said energy control device preferably is an electronic control comprising hardware components which are controllable by a software. Furthermore, preferably an operating and display panel is provided for which displays for the user the presently selected kind of energy operation as well as the cooling temperature and permit manual selection of kind of energy operation.

BRIEF DESCRIPTION OF DRAWINGS

Further advantages, features and details of the invention will become obvious from the following detailed description with reference to the attached drawing, wherein said FIGURE shows the schematic construction of an embodiment of the energy administration device in accordance with the present invention.

DETAILED DESCRIPTION OF PREFERRED EMBODIMENT

The energy administration device shown in the FIGURE is intended for installation in an absorption refrigerating device (not shown), wherein said refrigerating unit is provided for installation in campers, living vans, caravans or the like. In order to guarantee energy supply of the unit with a plurality of energy sources, said energy administration device permits operation with AC power supply, safety DC supply as well as gas, liquefied petroleum gas in particular. For operation with AC mains connection 1 is provided for, for DC operation the DC generator of the vehicle dynamo 2 which is connected to the starter battery 3 of the vehicle is provided for. In addition, as DC source also the board net of the vehicle can be used, which can be connected the a corresponding heating element 4b.

By the electric battery 14 the switch selected also by the relay 5b is closed, this connecting the electric current circuit with said heating element 4b. For operation with mains voltage the switches connected to said relay 5a are closed, this resulting in taking into operation of said net heating element 4a. An essential component of said energy administration device is the energy control unit 7 including electronic components for automatic selection and optimum control of the selected kind of energy. Said energy control unit communicates with a operating panel 16 which e.g. can be disposed on the front side of said absorption refrigerating device. Using said panel, the operator can select whether he desires an automatic control of the kind of energy by said energy control unit 7 or whether he desires to select the kind of energy manually. In addition, the user can switch on or off said refrigerating unit as well as set the desired cooling temperature. Said cooling temperature also is regulated using said energy control device 7, wherein for this regulation a temperature sensor 15 provided for in said refrigerating compartment and being connected to said energy control system 7. Using the detection of actual temperature in the refrigerating compartment and the comparison of this temperature to the set desired temperature, the selected kind of energy is regulated correspondingly. Said energy control device also is responsible for selection of the relays 5a and 5b and the switching operations connected therewith. If the system is in gas operation, said energy control device 7 controls said ignition and ionisation electrode 10 provided for ignition of said gas burner 11. In addition, a valve provided for in the gas supply line to said burner 11 and selectable electrically, is regulated by a selection 8 by means of pulse width modulation (PWM) by said control unit 7. Hereby, the gas flow in the gas supply line connected to a gas reservoir 13 is regulated and stopped, if required.

For guaranteeing an automatic energy selection, in the device in addition an undervoltage detection unit 6a as well as a board net current detection unit 6b are provided for. However, it also is conceivable that the electronics are supplied by an autonomous energy source. When said undervoltage detection unit detects a voltage of e.g. less than 200 V (i.e. below the common mains power of 230 V), said relay 5a effects switching of the switches connected thereto and termination of mains operation. Said energy control unit 7 then selects another energy source. Herein, it can be, depending on programming of the system, a matter of the DC source or the gas source. As well, in DC operation it can be switched to another energy source using said generator 2, when said board net current detection means 6a does not detect DC current or only a low value thereof.

An essential novelty of said energy administration system is the embodiment of the gas operation unit. Said gas burner 11 no longer is surveyed using a slowly responding thermal element but rather an ionisation sensor provided for in said ignition electrode 10 is used. Said sensor detects whether a gas flame exists on said burner. Said ionisation surveillance therein is effected using AC applied between said sensor and the burner mass. If a gas flame exists, the voltage is rectified thereby and thus burning of said gas burner is recognized. Said ionisation surveillance reacts on extinction of the burner flame substantially faster than a thermal element and thus control responding faster and improved, of said gas operation is guaranteed. Instead of using an ionisation sensor, such improvement can also be achieved by an UV sensor which detects the light of said gas flame. Surveillance of said gas operation of said system takes place as follows: After said gas flame was ignited in switching to gas operation by said ignition electrode 10, said electrode is surveyed continually as to whether said gas flame is burning. When said ionisation electrode detects that said gas flame goes out, subsequent ignition is effected. If thereafter still no gas flame can be detected, the system switches to defect and a defect notice is issued. Defect switching off results in that said gas supply line is closed immediately.

From the FIGURE it can further be seen that in front of said ignition and ionisation electrode a high-voltage clock generator 9 is connected which establishes a connection to said energy control system 7.

What is claimed:

1. An energy administration device for operating an absorption refrigerating device with different energy sources including
    an energy control unit (7) for controlling and selecting an energy source and at least one gas operation unit (8, 9, 10, 11, 12) for operating said absorption refrigerating device with gas with a gas burner (11) connected to a gas supply line and controllable by a surveillance system, wherein said surveillance system is an ignition surveillance system and comprises an ionisation sensor and/or UV sensor for surveying the gas flame of said gas burner (11).

2. The device as defined in claim 1, wherein said ionisation sensor and/or said UV sensor are integrated in said ignition electrode for ignition of said gas burner.

3. The device in one of the preceding claims, wherein said gas supply line comprises a valve (12) electrically selectable by pulse width modulation and which interrupts the gas supply when said absorption refrigerating unit is not operated using gas or when said energy control unit (7) does not detect cooling demand or an accident.

4. The device as defined in claim 1 or 2, wherein an AC operation unit (1) is provided for operation of said absorption refrigerating device with mains supply, 230 V mains supply in particular.

5. The device as defined in wherein an undervoltage detection unit (6a) is provided for which is coupled to said energy control unit (7) and said AC operation unit (1) in such a manner that said energy control system (7) selects said AC operation when said undervoltage detection unit (6a) detects a voltage higher than a given threshold value, preferably 200 V, and said energy control unit (7) switches to gas operation or DC operation when said undervoltage detection unit (6a) detects a voltage less than the given threshold value.

6. The device as defined in claim 1 or 2, wherein a DC operation unit (2, 3) is provided for operation of said absorption refrigerating device with DC, 12 V DC in particular.

7. The device as defined in claim 6, wherein said DC operation unit (2, 3) includes a generator operation unit (2).

8. The device as defined in claim 7, wherein said DC operation unit (2, 3) in addition includes a battery and/or solar operation unit (14).

9. The device as defined in wherein said energy control unit (7) is coupled to a board net current detection device (6b) in such manner that said energy control system selects DC operation when DC is detected, and selects another energy operation when no or very low DC, respectively, is detected.

10. The device as defined in wherein a temperature sensor (15) is provided for arrangement of said absorption refrigerating unit, said temperature sensor being connected to said energy control device and said different kinds of energy operation being controllable by means of the temperature detected by said sensor.

11. The device as defined in claim 1 or 2, wherein said device can be switched to the different operating modes manually.

12. The device as defined in claim 1 or 2, wherein said energy control unit (7) is an electric control, a control which can be regulated by a software in particular.

13. The device as defined in claim 1 or 2, wherein an operating and display panel (16) is provided for.

14. An absorption refrigerator including an energy administration device as defined in claim 1 or 2.

* * * * *

UNITED STATES PATENT AND TRADEMARK OFFICE
CERTIFICATE OF CORRECTION

PATENT NO. : 6,662,585 B2
DATED : December 16, 2003
INVENTOR(S) : Volker Müller et al.

It is certified that error appears in the above-identified patent and that said Letters Patent is hereby corrected as shown below:

<u>Title page</u>,
Item [73], Assignee, please delete "Dometic. GmbH", and insert therefor
-- Dometic GmbH --.

<u>Column 5</u>,
Line 24, after "defined in", please insert -- claim 4, --.

<u>Column 6</u>,
Line 11, after "defined in", please insert -- claim 6, --.
Line 17, after "defined in", please insert -- claim 1 or 2, --.

Signed and Sealed this

Twenty-seventh Day of April, 2004

JON W. DUDAS
*Acting Director of the United States Patent and Trademark Office*